Aug. 17, 1948.   H. M. HEUVER ET AL   2,447,013
MOTION TRANSMITTING DEVICE
Filed Oct. 1, 1945                                     2 Sheets-Sheet 1
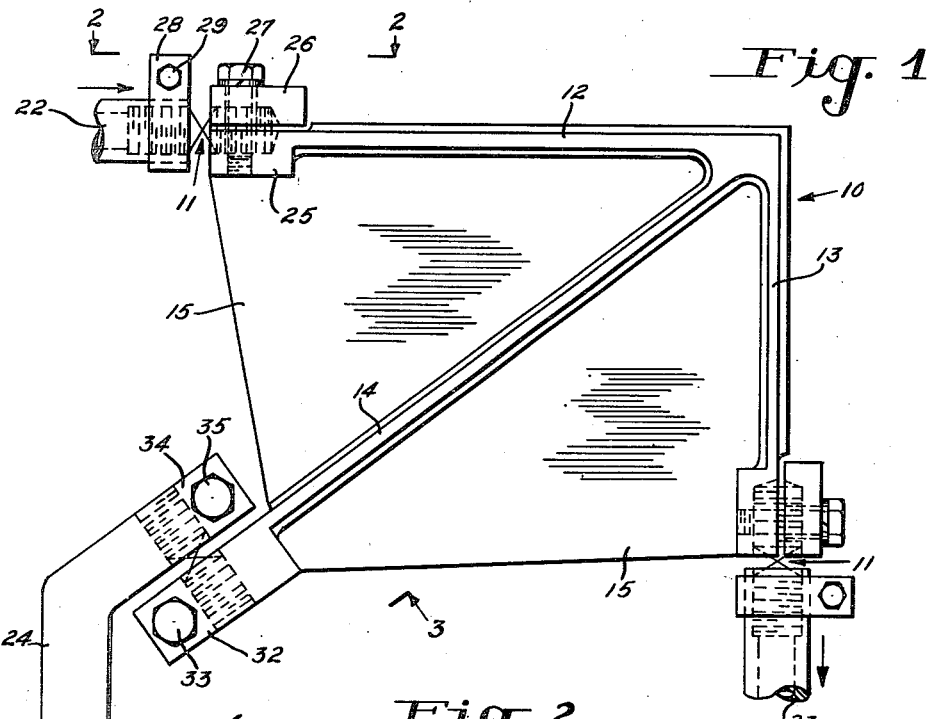
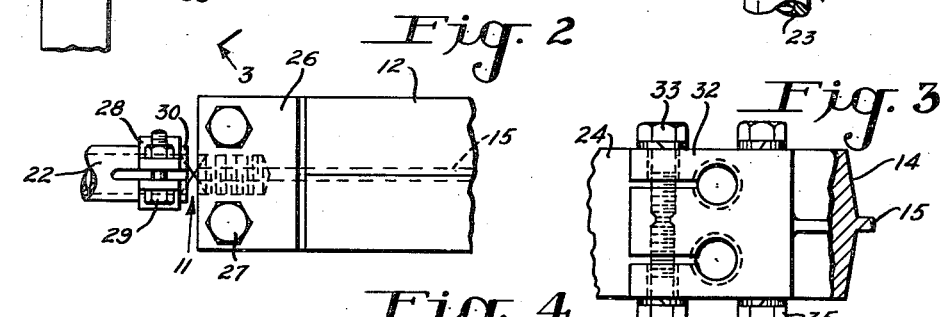
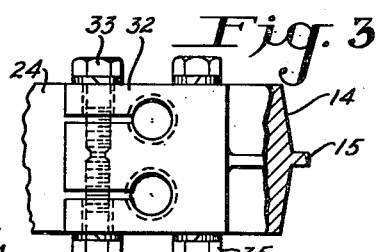
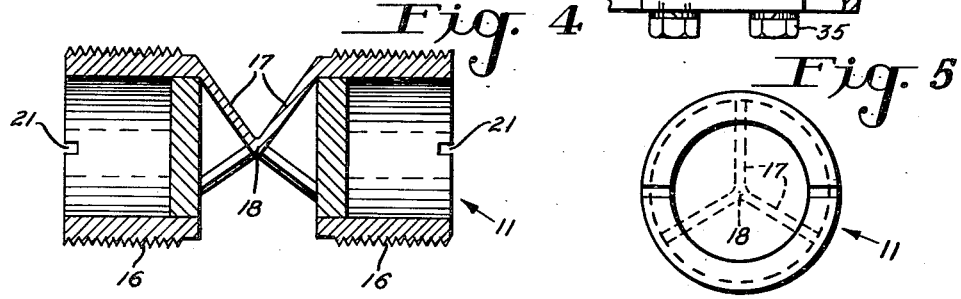
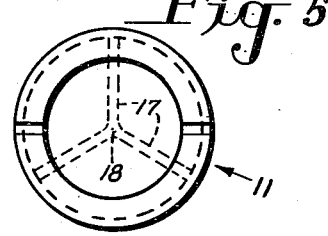
INVENTORS
HERBERT M. HEUVER
EDWARD A. RUTAN
BY
ATTORNEYS

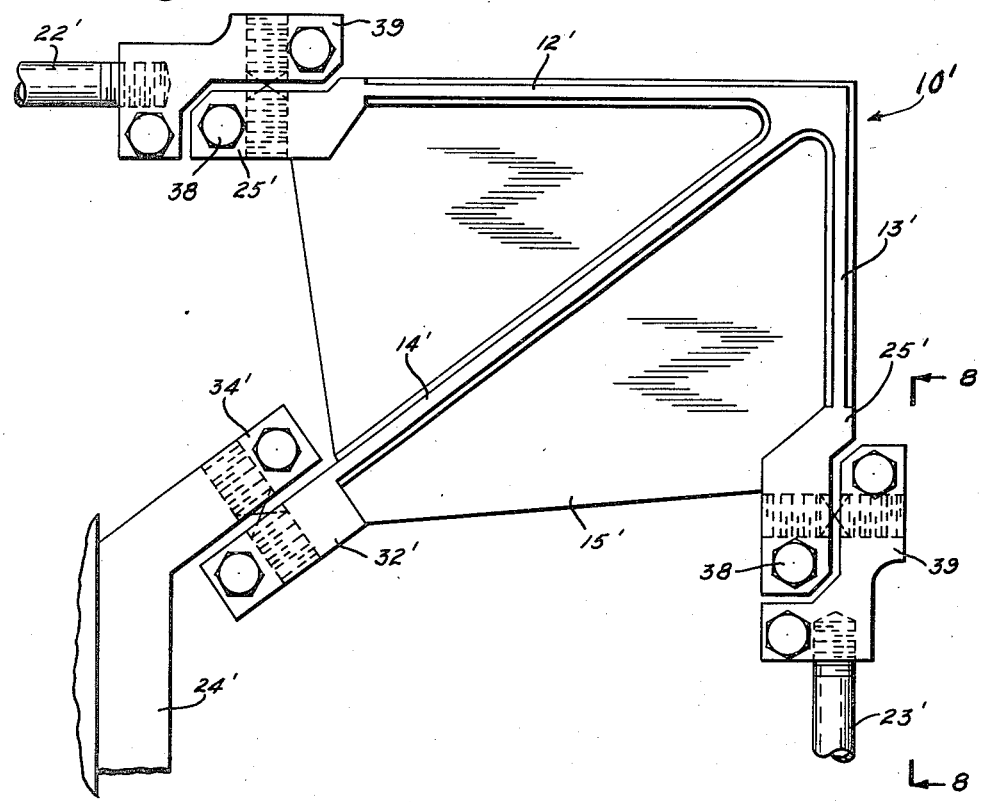
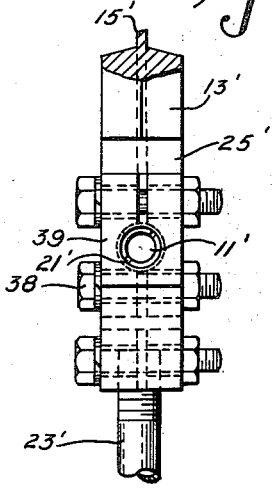
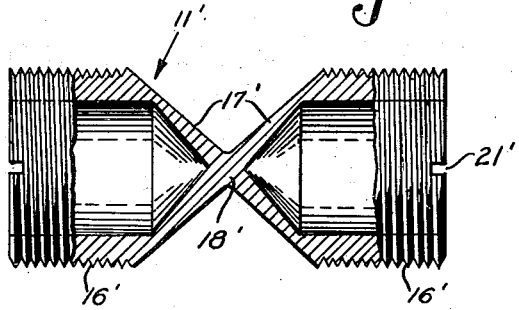

Patented Aug. 17, 1948

2,447,013

UNITED STATES PATENT OFFICE 2,447,013

MOTION TRANSMITTING DEVICE

Herbert M. Heuver, Dayton, Ohio, and
Edward A. Rutan, Elmira, N. Y.

Application October 1, 1945, Serial No. 619,730

10 Claims. (Cl. 74—519)

(Granted under the act of March 3, 1883, as
amended April 30, 1928; 370 O. G. 757)

The invention described herein may be manufactured and used by or for the Government for governmental purposes without the payment to us of any royalty thereon.

This invention relates to motion transmitting devices, and more particularly to devices adapted for use in connection with sensitive instruments, such as a wind tunnel balance and the like.

One of the objects of this invention is to provide a motion transmitting device adapted for connecting or for supporting the movable parts of a sensitive instrument, such as a wind tunnel balance, whereby the whole balance or instrument can be adjusted or aligned without removing any of the parts thereof.

A more particular object of this invention is to provide such a motion transmitting device comprising flexure pivots combined with a bell crank and being arranged so that the leverage of said bell crank can be readily adjusted to modify its mechanical effect by merely turning one or more of said pivots.

Another object of this invention is to provide such a device whereby the magnitude of an applied force on the bell crank can be readily modified by a definite amount, by merely adjusting the pivots and thereby changing the relative lengths of the lever arms of the bell crank.

Another object of this invention is to provide such a device which comprises a bell crank combined with flexure pivots for obtaining, under all magnitudes of loads, an approximately constant stiffness about any bending axis.

Other objects and advantages are attainable with this invention as will become apparent from the following disclosure.

In the drawings:

Fig. 1 is a view showing the invention in a preferred form, wherein the bell crank lever has its fulcrum pivots loaded in shear and has its motion transmitting pivots loaded directly.

Fig. 2 is a detail view taken on line 2—2 of Fig. 1, showing one form of pivot connection between the bell crank and one of the motion transmitting elements.

Fig. 3 is a detail view taken on line 3—3 of Fig. 1, showing the pivot connection between the bell crank and the supporting bracket.

Fig. 4 is a longitudinal sectional view of the tripod form of flexure pivot.

Fig. 5 is an end view thereof.

Fig. 6 is a part sectional and part plan view of the conical form of flexure pivot.

Fig. 7 is a view showing this bell crank and pivot and the associated means in a slightly modified form, wherein all the pivots are positioned to be loaded in shear.

Fig. 8 is a detail view taken on line 8—8 of Fig. 7, showing the connection between the bell crank and a motion transmitting element.

This improved motion transmitting device comprises a main motion or force transmitting member 10 which is substantially a lever and is shown in the form of a bell crank, and this device further comprises a novel flexible pivot 11 which is combined with and cooperates with said main member 10 for transmitting motion by means of this device from one movable element to another.

The bell crank 10 comprises a pair of arms or ribs 12 and 13 which are joined together at one end, forming one angle of said member 10, and in this disclosed form these arms extend substantially at right angles to one another. An arm 14 extends diagonally from the junction of arms 12 and 13 to the opposite corner of member 10 and serves as a fulcrum arm for attachment to a suitable support. A plate or web 15 extends between these three arms and serves as brace means therebetween, and the member 10 is hereby made substantially rectangular in shape, with the arms 12 and 13 forming the crank arms of the bell crank.

The novel pivot 11 comprises a pair of similar portions or shoulders 16 which are spaced slightly apart and have converging portion 17 on their adjoining ends which portions are merged at the apexes to provide a flexible neck 18 thereby. These pivots preferably have the pair of shoulders 16 constructed as two tubular portions which are axially aligned and are connected by the pair of contracted parts 17, and these shoulders are arranged to have one of the pair adjustably connected to either of the arms 12, 13, or 14, and the other of the pair of shoulders similarly connected to either one of the movable elements 22 or 23 of a sensitive instrument, such as a wind tunnel balance, or to a supporting bracket 24. Moreover, in the form of pivots illustrated herein, the shoulders are threaded exteriorly and are also provided with means 21 to be engaged by an operating tool, so as to facilitate turning and adjusting the pivot and thereby provide a readily adjustable connection between the arm and the associated means.

In the form shown in Fig. 1 of the drawings the pivots 11 at the ends of arms 12 and 13 are positioned so that each has its axis parallel to these arms 12 and 13 and these pivots are thus loaded directly. An enlarged part 25 of arm 12 has a clamping block 26 secured thereto by a bolt 27 to clamp and retain the threaded shoulder 16 of the pivot in position. A clamping ring 28 is secured by a bolt 29 over the split end 30 of element 22 thereby firmly securing the other threaded shoulder in the threads provided in said end 30. A like pivot 11 and a similar block and connecting ring and securing bolts are provided for connecting arm 13 with element 23.

In the present disclosure the element 22 is indicated as the motion or force applying means, and the element 23 is indicated as the motion receiving and conveying means whereto the motion or force is applied by means of the interposed bell crank 10 with its pivots 11.

The connection between fulcrum arm 14 and bracket 24 includes a pair of these pivots 11, a pair being used to provide stability to the bell crank. The pivot shoulders are engaged at one end in threaded bores provided in the enlarged split end part 32 of fulcrum arm 14, and said split end parts are drawn together by bolts 33. At the other end the pivots are threaded in similar bores provided in the end part 34 on supporting bracket 24, being similarly drawn tight by bolts 35 to clamp the shoulders 16 of said pair of fulcrum pivots in position. These pivots are mounted to place their axes at right angles to the line of the resultant force, along arm 14, and are therefore loaded in shear; and they thus maintain a constant stiffness about any bending axis, since half of the material, at one side of the longitudinal axis of the flexure necks, is in tension and half, at the other side, is in compression. The pivots can also be rotated for providing adjustment, between the connected members, while at the same time their desired stiffness and flexibility remains constant.

These pivots 11 are shown as having the two shoulders 16, which are preferably arranged cylindrical and threaded exteriorly, while the converging parts 17 are shown in Figs. 4 and 5 as including each a plurality of legs, arranged in the form of tripods, which converge and are merged at the apexes into the flexure neck 18.

Fig. 6 discloses the pivot in a modified form wherein the pair of contracted neck portions are shown in the form of cones 17' extending from the pair of exteriorly threaded axially aligned shoulders 16' to merge into a flexure neck 18'. The pivot in either form includes the central flexure neck existing at the merged apexes of the pair of contracted neck portions protruding from the pair of axially aligned shoulders.

Figs. 7 and 8 disclose a modified form or an alternate method utilized in mounting the motion transmitting elements by means of these pivots on the arms 12' and 13' of the bell crank 10'. Herein these pivots are mounted with their axes at right angles to the force applied by the connecting element 22' through the bell crank member 10' including its arms 12', 13', and 14' and the interposed web 15', to the element 23'. All the pivots herein are thus loaded in shear. The arms 12' and 13' are provided each with an enlarged end portion 25' having threaded bores provided therein for receiving the pivot shoulders, and said portions 25' being split and drawn together upon the pivot shoulder by bolts 38, while the other pivot shoulder is threaded in a block 39 mounted on the end of the adjoining motion transmitting element. The arm 14' has an enlarged part 32' provided with a pair of threaded bores which receive the shoulders of the pair of pivots 11 therein that have the other shoulders threaded in the bores in the end part 34' of the supporting bracket 24', being clamped in place by suitable bolts, substantially the same as in the preceding form.

Where the pivot is provided, in the preferred manner, with a continuous thread running in the same direction for both shoulders, as shown in Fig. 6, then by turning the pivot in the connected arm and element, the position of the pivot with its flexure neck is shifted along the longitudinal axis so that the neck is thereby moved toward or away from the end of the arm. This adjustment of the pivot adds to or subtracts from the effective length of one lever arm, thereby changing the ratio or proportionate lengths of the pair of bell crank arms and hence changing their mechanical effect.

With this invention, when the pivot is provided on one shoulder with a right-hand thread and on the other shoulder with a left-hand thread, various adjustments can be provided between the bell crank 10 and the connected elements 22 and 23. For example, by loosening the clamping block 26 and the clamping ring 28, the connected element 22 can be brought closer to the adjoining bell crank arm or farther away therefrom by rotating the interposed pivot in the appropriate direction, thereby adding to or subtracting from the effective length of one bell crank arm; and likewise the connected tubular rod or element 22 or 23 can be lengthened or shortened by rotating such an attached pivot.

We claim:

1. A motion transmitting device comprising a fixed support, a bell crank member supported thereby, and a plurality of flexure pivots connected with the bell crank member, said device being adapted to transmit movement applied by means positioned at one part of the member as a proportionate movement to means positioned at another part of said member, the flexure pivots including each a pair of spaced attaching shoulders containing thereon a pair of converging neck portions merging into a narrow flexure neck therebetween, one shoulder being adjustably attached to said member and the other shoulder similarly attached to the means connected thereto, whereby the relative mechanical effect of the bell crank can be readily modified without removing any of the parts of the whole device.

2. A motion transmitting device for interposition between and connection with the movable elements of a sensitive instrument and transmit motion applied by an element connected with one part of the device to a motion receiving element connected with another part of the device, said device comprising fixed supporting means and a bell crank member and flexure pivots, one pivot connecting said member with the motion applying element, another pivot connecting said member with the element whereto it applies the motion, and another pivot connecting said member with said fixed supporting means, each pivot comprising a pair of attaching shoulders and a narrow flexure neck therebetween, one of said shoulders being rotatably adjustable on said member and the other of said shoulders being rotatably adjustable on one of said means, so that the motion transmitting effect of the device can be readily adjusted by merely rotating one or more of the pivots.

3. A motion transmitting device comprising a main member including a substantially quadrilateral web containing arms thereon arranged in the form of a bell crank and also containing a supporting arm connected with said arms, said member being adapted to have motion applied thereto in a certain direction by means located at the end of one crank arm at one corner of the member to transmit the motion in another direction to means located at the end of the other crank arm at another corner of said member, fixed supporting means adjoining the supporting arm at a third corner for movably supporting said member, and flexure pivots having each two spaced portions and a contracted flexure neck therebetween connecting said portions, each of said pivots having one portion adjustably connected with one of said arms at one corner of said member and having the other portion adjustably connected to one of said means, whereby the ratio of the two lever arms can be readily adjusted for modifying the mechanical effect of the device.

4. The subject matter set forth in claim 3, wherein the pivot is in the form of a pair of threaded cylindrical shoulders rotatably adjustable on both the corner and the associated means, and the pair of shoulders include a pair of integral converging portions which are merged at the apexes to provide a contracted flexure neck.

5. A motion transmitting device comprising a main member containing arms thereon arranged as a bell crank and adapted to have motion applied thereto in a certain direction by means located at the end of one crank arm to transmit the motion in another direction to means located at the end of the other crank arm, a supporting arm between said crank arms, fixed means associated with said supporting arm for supporting the member, threaded means on each of the aforesaid means and also a threaded part on each of said arms, and flexure pivots having each two spaced apart threaded portions and a flexure neck therebetween of reduced cross-sections connecting said threaded portions, each of said pivots having one portion adjustably connected to a threaded part of one of said arms and having the other portion adjustably connected to one of said threaded means, whereby the device can be readily adjusted for modifying its mechanical effect by rotating one of said pivots.

6. A flexure joint for insertion between two axially aligned members to provide angular displacement of small amplitude in any direction of the axis of one member relative to the axis of the other, said joint comprising, in a single piece, two axially spaced adjustable attaching portions one for each said member, the interfacing ends of said attaching portions being joined by two integral hollow cones the bases of which merge with and are an integral part of the said interfacing ends and the apexes of which merge, one apex with the other to form a small integral flexure neck at the point of juncture.

7. The device of claim 6 wherein a portion of each hollow cone has been removed, leaving of each hollow cone a series of legs converging inwardly from the interfacing ends of the attaching portions to the flexure neck formed by the merged apexes.

8. The subject matter set forth in claim 6, wherein the attaching portions are in the form of a pair of cylindrical portions provided with threaded means for rotatably connecting them adjustably to said members, and said pair of cylindrical portions are connected by a pair of tripods which converge from the portions and are joined at the apexes to constitute the flexure neck.

9. The subject matter set forth in claim 6, wherein the attaching portions are in the form of a pair of cylindrical portions provided with threaded means for rotatably connecting them adjustably to said members, and said pair of cylindrical portions are connected by a pair of cones which converge from the cylindrical portions and are joined at the apexes to constitute the flexure neck.

10. A flexure pivot for connecting two adjacent elements provided each with a threaded part, whereby to provide relative flexing movement between said elements, said pivot consisting of a pair of substantially alike tubular attaching portions being threaded and attachable interchangeably and adjustably to said threaded parts on said elements, and a pair of neck portions integral with and converging from said pair of attaching portions being merged together and integral at the apexes, thereby constituting a contracted flexure neck uniting said converging portions, whereby this pivot will maintain a constant bending stiffness although rotated to any desired degree.

HERBERT M. HEUVER.
EDWARD A. RUTAN.

REFERENCES CITED

The following references are of record in the file of this patent:

UNITED STATES PATENTS

| Number | Name | Date |
|---|---|---|
| 1,041,609 | Emery | Oct. 15, 1912 |
| 1,262,787 | Harley | Apr. 16, 1918 |
| 1,389,728 | Akimoff | Sept. 6, 1921 |
| 1,671,764 | Dickey | May 29, 1928 |
| 2,177,398 | Aller | Oct. 24, 1939 |
| 2,319,463 | Lear | May 18, 1943 |

FOREIGN PATENTS

| Number | Country | Date |
|---|---|---|
| 478,101 | Great Britain | Jan. 12, 1938 |